United States Patent [19]

Shinozaki et al.

[11] Patent Number: 5,175,577
[45] Date of Patent: Dec. 29, 1992

[54] DRIVE MEMBER SENSING ARRANGEMENT FOR AN AUTOMATIC FOCUSING SYSTEM OF A CAMERA

[75] Inventors: Nobuo Shinozaki; Hiroyuki Koizumi; Atsushi Takami; Tadashi Ishikawa, all of Chiba, Japan

[73] Assignee: Seikosha Co., Ltd., Tokyo, Japan

[21] Appl. No.: 798,352

[22] Filed: Nov. 21, 1991

Related U.S. Application Data

[63] Continuation of Ser. No. 543,624, Jun. 26, 1990, abandoned.

[30] Foreign Application Priority Data

Jun. 28, 1989 [JP] Japan .................. 1-166058

[51] Int. Cl.⁵ .............................. G03B 13/36
[52] U.S. Cl. ........................................ 354/400
[58] Field of Search ..................... 354/400–409, 354/234.1, 435, 439, 195.1

[56] References Cited

U.S. PATENT DOCUMENTS

| | | | |
|---|---|---|---|
| 4,348,089 | 9/1982 | Shenk | 354/195 |
| 4,881,096 | 2/1987 | Ogihara et al. | 354/400 |
| 4,918,479 | 4/1989 | Inoue et al. | 354/400 |

Primary Examiner—W. B. Perkey
Attorney, Agent, or Firm—Jordan and Hamburg

[57] ABSTRACT

An automatic focusing system for a camera comprises a motor rotatable in opposite directions, a drive member driven for rotation by the motor, a distance-setting member rotatable together with the drive member to place an objective lens in an initial position and movable to a predetermined forward position, and a holding mechanism for holding the distance-setting member in the predetermined forward position. The position of the drive member is identified at each monitoring point, and a position identification signal is generated. The sequence of movement of the distance-setting member is analyzed from a starting position to the predetermined forward position. The system further provides for preventing improper holding of the distance-setting member at its initial position.

5 Claims, 6 Drawing Sheets

DRIVE MEMBER SENSING ARRANGEMENT FOR AN AUTOMATIC FOCUSING SYSTEM OF A CAMERA

This application is a continuation, of application Ser. No. 07/543,624, filed Jun. 26, 1990, now abandoned.

BACKGROUND OF THE INVENTION

1. Field of the Invention

The present invention relates generally to automatic focusing systems for a camera and in particular, to an automatic focusing system which can analyze a sequence of movements of a distance-setting or focusing member from an initial position to a focal position.

2. Description of the Related Art

A conventional automatic focusing system for a camera typically includes an objective lens focusing mechanism mounted to a shutter unit as shown in FIG. 6. A drive member 1 is rotatably mounted to a base plate 2 of the shutter unit and has a sector gear 1a operatively connected through an idler gear 3 to a stepper motor 4. The stepper motor 4 is rotatable in both directions according to a predetermined program to drive the drive member 1 for focusing, exposure and returning purposes. An operating cam 1b extends radially and outwardly from its outer periphery and cooperates with an operating lever 5 to open and close a shutter (not shown).

A distance-setting member 6 has a drive portion 6a designed to move an objective lens (not shown) to a focal position and is mounted to the base plate 2 of the shutter unit, like the drive member 1. The distance-setting member 6 also has a sector gear 6b in meshing engagement with a pinion 7a which is, in turn, integrated with a ratchet wheel 7. A spring 6c is arranged to rotate the distance-setting member 6 in a clockwise direction together with the drive member 1. An engaging lever or pawl 8 is pivotally mounted to the base plate 2 by a pin and biased by a spring 8a to rotate in a clockwise direction. The pawl 8 has an iron piece 9a which is attracted to an electromagnet 9. When the electromagnet 9 (also referred to as an AF magnet) is rendered nonmagnetized, then the pawl 8 is rotated in a clockwise direction to allow its free end to come into engagement with teeth of the ratchet wheel 7. This holds the distance-setting member 6 in a focal position.

A pinion 11a is fixedly mounted to one end of the stepper motor 4 and is operatively connected to the drive member 1. When the stepper motor 4 is rotated in a reverse direction, the pinion 11a causes the ratchet wheel 7 to rotate in a clockwise direction via the drive member 1, a pin on the cam 1b, and the distance-setting member 6. The pawl 8 is then moved out of engagement with the teeth of the ratchet wheel 7, the free end of which is held in a position away from the teeth of the ratchet wheel 7 upon energization of the electromagnet 9.

In a focusing mode of operation, the stepper motor 4 is rotated in a clockwise direction to drive the drive member 1 through the pinion 11a. The distance-setting member 6 is then rotated in a clockwise direction under the action of the spring 6c. A scanning lever (not shown) has a luminous element which is operative to provide a light beam upon the rotation of the distance-setting member 6. Such a light beam is reflected from the subject and is then received by a light receiving element (not shown). A focus signal is correspondingly developed so as to visually display distance information within the field of view of a camera viewfinder. Also, the electromagnet 9 is rendered nonmagnetized so as to allow the pawl 8 to rotate in a clockwise direction. This causes the pawl 8 to come into meshing engagement with the ratchet wheel 7 and thus restrains rotation of the distance-setting member 6. As a result, the objective lens is held in its focal position.

Upon further rotation of the stepper motor 4, the drive member 1 is rotated in a clockwise direction to cause the cam 1b to rotate the pin 5a of the operating lever 5 in a counterclockwise direction. The stepper motor 4 no longer controllably drives the distance-setting member 6 and is, in turn, active to open and close a shutter for exposure purposes. It will be noted that the stepper motor 4 can be rotated in a clockwise or counterclockwise direction in response to phase pulses from a stepper motor drive circuit 4a.

The distance-setting member 6, when held in a starting position, is constantly urged by the spring 6c to rotate in a clockwise direction. At this time, a home switch Hs, as a means for identifying the position of the distance-setting member 6, is held in an open state. This home switch Hs is closed when the distance-setting member 6 is moved from a starting position to a focal position. This indicates that the distance-setting member 6 is properly moved in a sequential manner.

In such a conventional automatic focusing system, the home switch Hs is mounted to the pin 6d of the distance-setting member 6. With this arrangement, the stepper motor 4 is rotated in a reverse direction so as to rotate the ratchet wheel 7 in a clockwise direction. The pawl 8 is then moved out of engagement with the teeth of the ratchet wheel 7. The free end of the pawl 8 is thus held in a position away from the teeth of the ratchet wheel 7. The distance-setting member 6 is released at the time of release of a first tooth of the ratchet wheel and then is free to rotate in a reverse direction through the pinion 7a to thereby close the home switch Hs. A minimum stroke is required for such rotation of the distance-setting member 6. Normally, the teeth of the ratchet wheel 7 correspond to 30 to 40 steps. However, such a minimum stroke of the ratchet wheel 7 requires eight pulses and occupies 20% of the teeth of the ratchet wheel 7. Thus, this stroke can not be used for focusing purposes.

The teeth of the ratchet wheel 7 and the free end of the pawl 8 are precisely finished in a manner to avoid improper engagement therebetween. If the first tooth of the ratchet wheel 7 is not properly engaged with the pawl 8, the distance-setting member 6 is not moved properly.

SUMMARY OF THE INVENTION

In view of the foregoing, it is an object of the present invention to provide an automatic focusing system for a camera which includes means for identifying the position of a drive member at each monitoring point and means for analyzing the sequence of movement of a distance-setting member in an exposure mode of operation, thereby reducing any possible ineffective stroke of a ratchet wheel.

It is another object of the invention to provide an automatic focusing system for a camera wherein means is provided to prevent improper engagement of a distance-setting member with the first tooth of a ratchet wheel so as to properly carry out an exposure mode of operation.

Briefly stated, in accordance with the invention, an automatic focusing system for a camera has a reversible motor coupled to drive a drive member, such as a drive ring. The drive member is coupled to drive a distance-setting member, such as a range ring. The range ring is coupled to control the positioning of an objective lens. The lens is movable from an initial position, to a forward position to focus the lens on an object. A distance detecting arrangement detects the distance to an object, and controls a holding arrangement to hold the lens the forward position. The position of the drive member is detected at a number of monitoring points during a focusing operation, to produce position identification signals. The position identification signals are analyzed in order to ensure that the focusing operation has been properly effected.

BRIEF DESCRIPTION OF THE DRAWINGS

A better understanding of the invention made be had by reference to the following detailed description of a preferred embodiment when taken in conjunction with the accompanying drawings, in which.

DESCRIPTION OF THE PREFERRED EMBODIMENT

Figure 1:
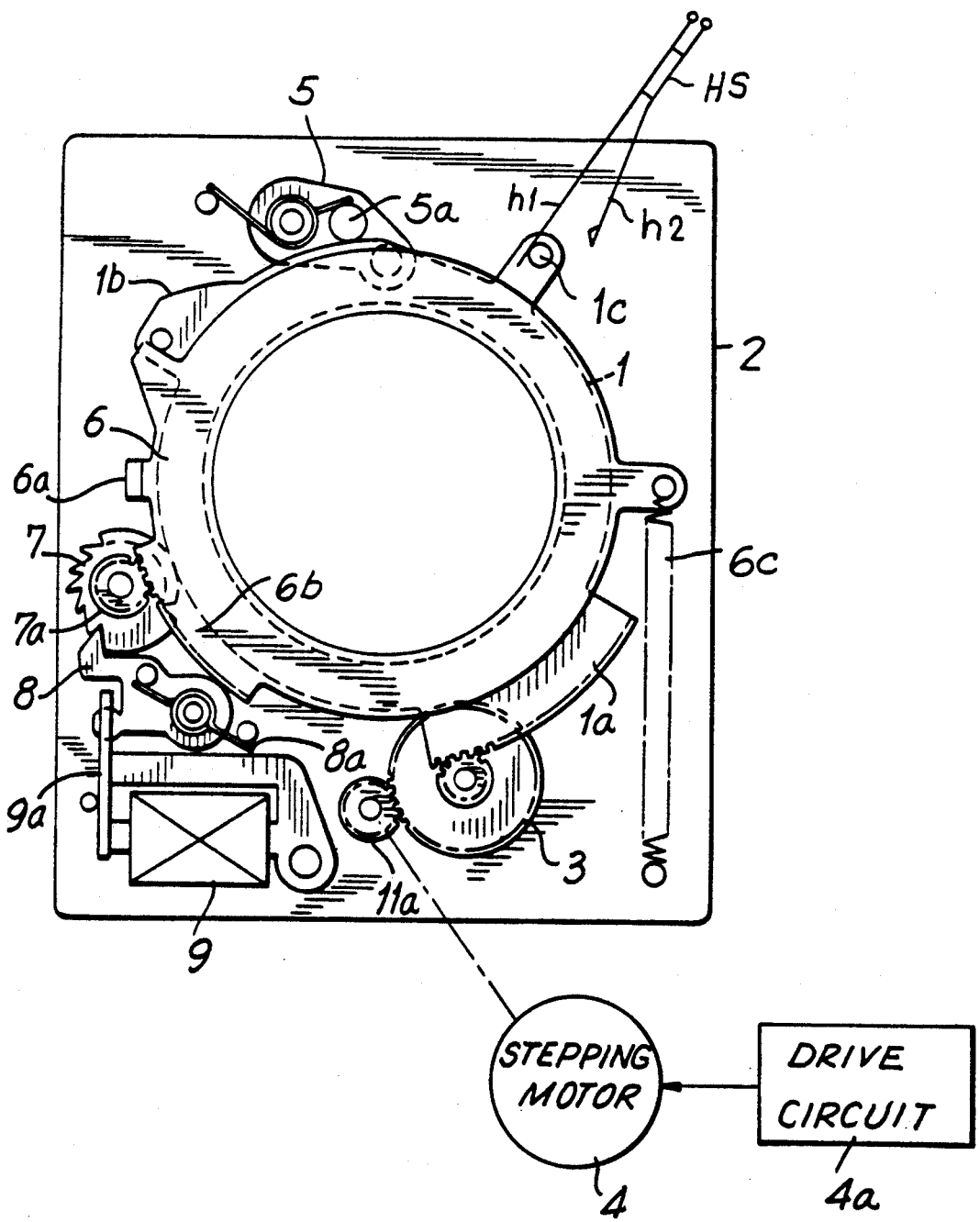
FIG. 1 is a view showing an automatic focusing system for a camera constructed according to one embodiment of the present invention.

Reference will now be made to an automatic focusing system for a camera constructed according to the invention, by way of example, shown in FIG. 1 through FIG. 4. Equivalent elements in FIG. 5 will be identified with the same reference numerals.

Referring first to FIG. 1, a drive member 1 includes a projection extending radially outwardly from its outer periphery and having a pin 1c thereon. A home switch Hs is normally open and has a movable contact $h_1$. A free end of the movable contact $h_1$ is supported by the pin 1c. When the drive member 1 is rotated in a clockwise direction, the movable contact $h_1$ is brought into contact with a fixed contact $h_2$.

Figure 2:
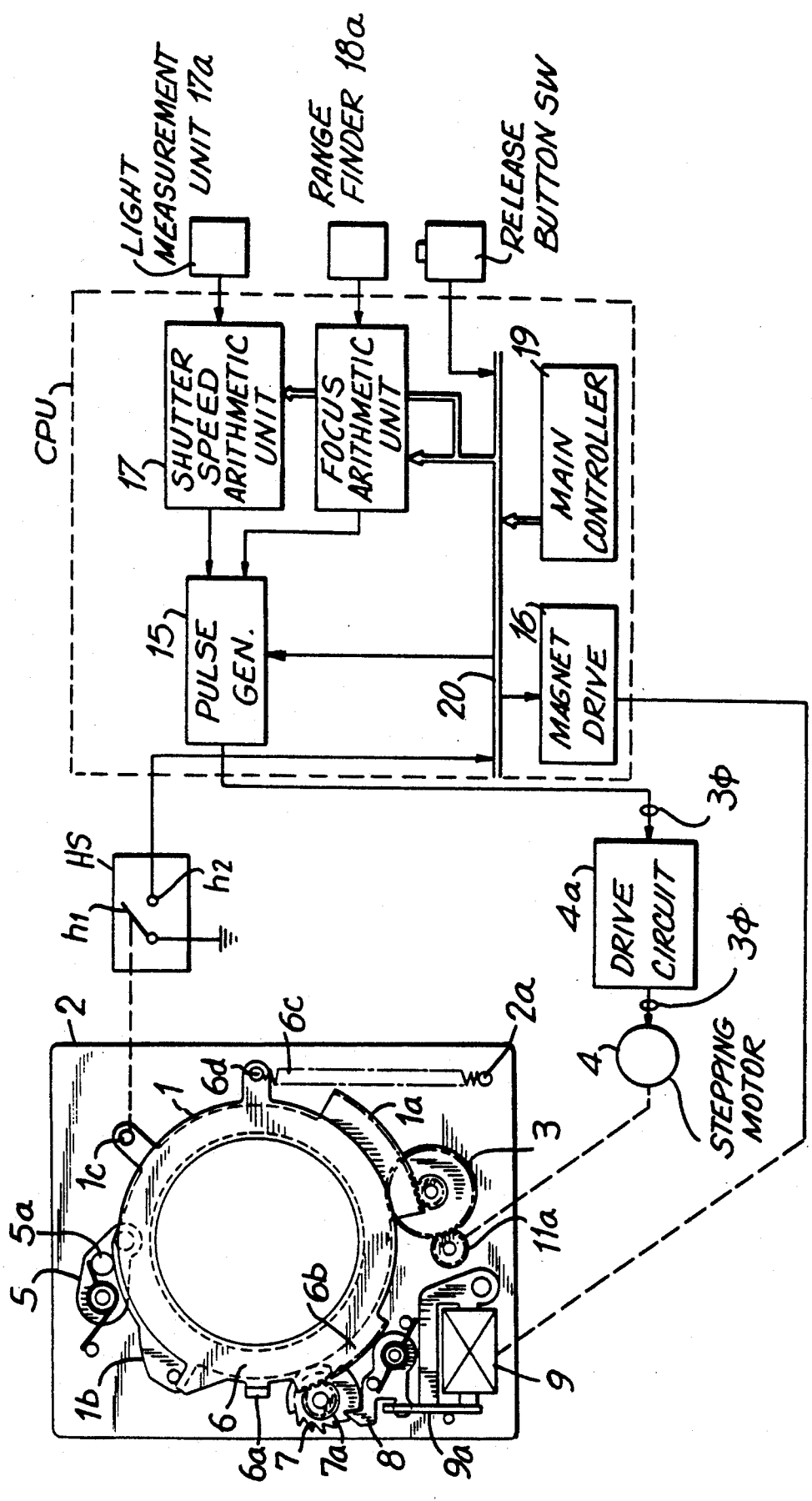
FIG. 2 is a block diagram of a system for controlling the automatic focusing system shown in FIG. 1.

A signal is developed in response to opening and closing of the home switch Hs and then, fed to a main controller 19 in a central processing unit through a data bus 20 as shown in FIG. 2.

Figure 3:
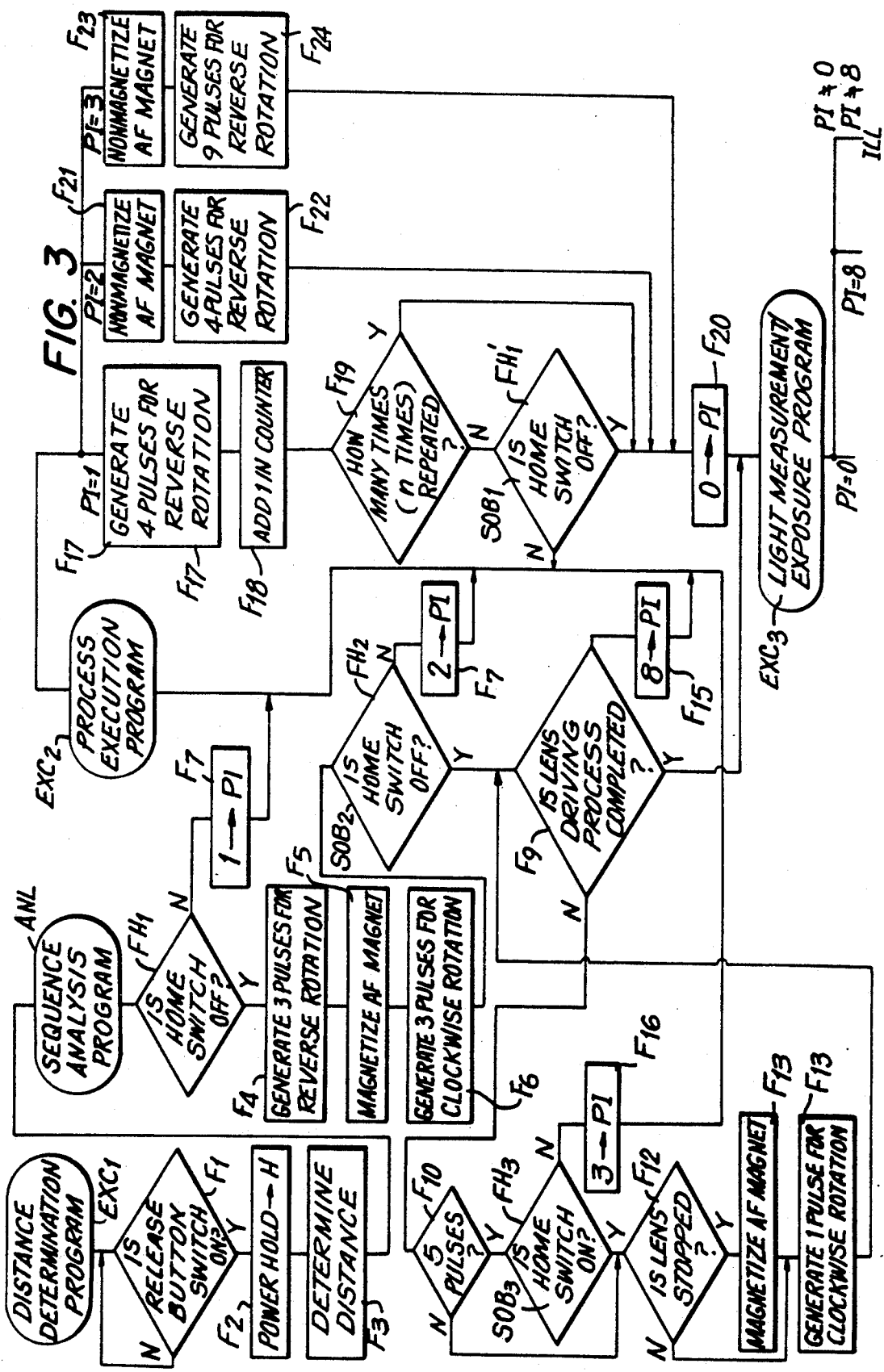
FIGS. 3 and 4 are flow diagrams of programs for controlling the automatic focusing system shown in FIG. 1.

At points $FH_1$, $FH_2$ and $FH_3$ in a sequence analysis program ANL shown in FIG. 3, sequence monitoring points $SOB_1$, $SOB_2$, $SOB_3$ are active to find whether the home switch Hs is on or off. Also, at point $SOB_4$ in a light measurement/exposure program $EXC_3$ shown in FIG. 4, a monitoring point $SOB_4$ is active to find whether the home switch Hs is on or off. At point $FH'_1$ in a process execution program $EXC_2$, the monitoring point $SOB_1$ is active to find whether the home switch Hs is off or not.

As shown in FIG. 2, a pulse generator 15, an AF magnet drive unit 16, a shutter speed arithmetic unit 17, and a focus arithmetic unit 18 all receive data from a light measurement unit 17a and a rangefinder 18a and are controlled according to the programs $EXC_1$ to $EXC_5$ and ANL.

Operation of a release button SW shown in FIG. 2, whether it is on or off, is monitored at point $F_1$ in a distance determination program $EXC_1$ (FIG. 3). When the release button SW is on, a power hold is set to H at point $F_2$. At point $F_3$, the distance of an object is determined. Thereafter, the sequence analysis program ANL is initiated to analyze the operating condition of the home switch Hs at monitoring points $SOB_1$, $SOB_2$ and $SOB_3$ to find whether the home switch Hs is on or off. When it is found that the home switch Hs is not properly operated, then a process indicator PI is set to 1, 2 or 3 to initiate the process execution program $EXC_2$. When it is found that the home switch Hs is properly operated, then the process indicator PI is set to 8 to initiate the light measurement/exposure program $EXC_3$.

At point $FH_1$ in the sequence analysis program ANL, the monitoring point $SOB_1$ is active to monitor the operating condition of the home switch Hs. When the home switch Hs is properly operated, then three pulses are generated to rotate the stepper motor 4 in a reverse direction at point $F_4$, the AF magnet is rendered magnetized at point $F_5$, and another three pulses are generated to rotate the stepper motor 4 in a clockwise direction at point F6.

Next, at point $FH_2$, the monitoring point $SOB_2$ is active to monitor the operating condition of the home switch Hs. When the home switch Hs is properly operated, single pulses are sequentially generated to rotate the stepper motor 4 in a clockwise direction at point $F_{14}$ until the process of driving the objective lens is completed at point $F_9$. As noted earlier, the process indicator PI is then set to 8 (PI=8) at point $F_{15}$. In the process of driving the objective lens, when five pulses have been generated to rotate the stepper motor 4 in a clockwise direction at point $F_{10}$, the monitoring point $SOB_3$ is active to monitor the operating condition of the home switch Hs to find whether or not it is on at point $FH_3$. If the total number of pulses generated are other than five, then the objective lens is stopped at point $F_{12}$, the AF magnet is rendered nonmagnetized at point $F_{13}$, and one pulse is generated to rotate the stepper motor 4 in a clockwise direction at point $F_{14}$.

The process execution program $EXC_2$ will be executed as follows: When PI=1, four pulses are first generated to rotate the stepper motor in a reverse direction at point $F_{17}$. At point $F_{18}$, one is added to a counter. At point $F_{19}$, it is found how many times (n times) such operation has been repeated. At point $FH'_1$, the monitoring point $SOB_1$ is active to monitor the operating condition of the home switch Hs to find whether it is off or not. If the home switch Hs is properly operated, then the process indicator PI is set to zero (0) so as to initiate the light measurement/exposure program $EXC_3$. When PI=2, the AF magnet is rendered nonmagnetized at point $F_{21}$. Four pulses are then generated to rotate the stepper motor 4 in a reverse direction at point $F_{22}$. When PI=3, the AF magnet is rendered nonmagnetized at point $F_{23}$. Nine pulses are then generated to rotate the stepper motor in a reverse direction at point $F_{24}$.

Figure 4:
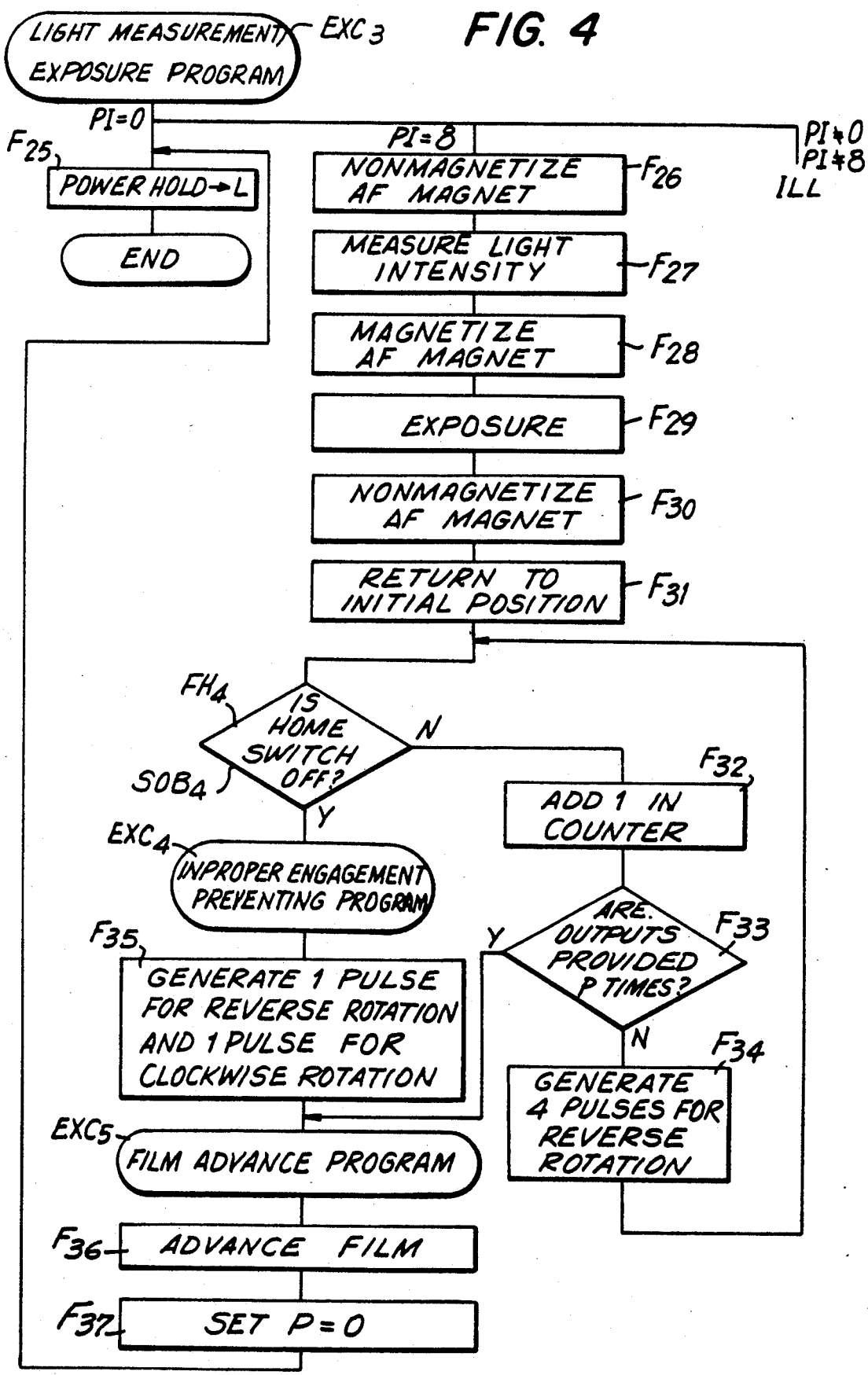
Figure 5:
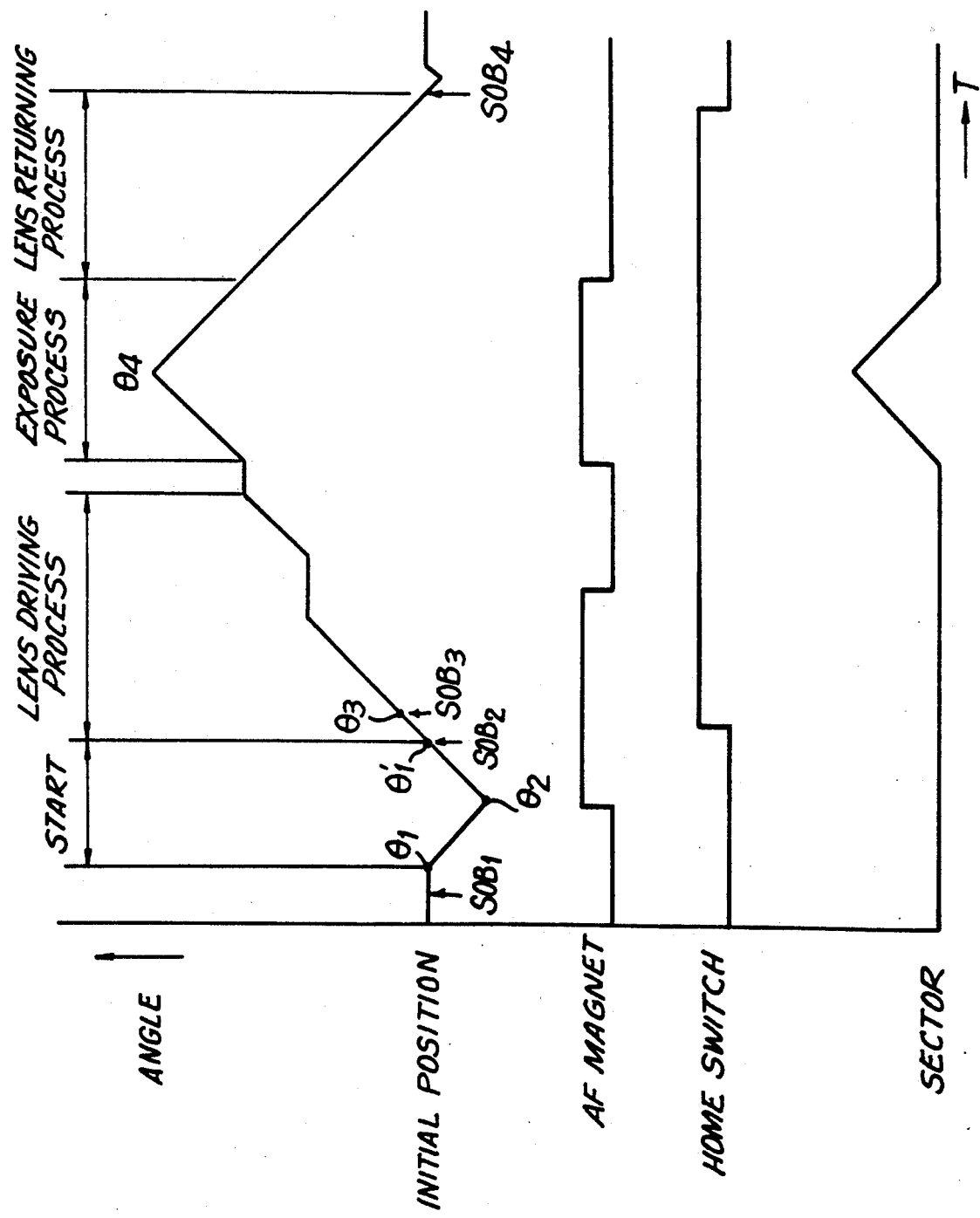
FIG. 5 is a graph showing time vs. operating conditions of the drive member, AF magnet, home switch and sector according to the program shown in FIGS. 3 and 4.
Figure 6:
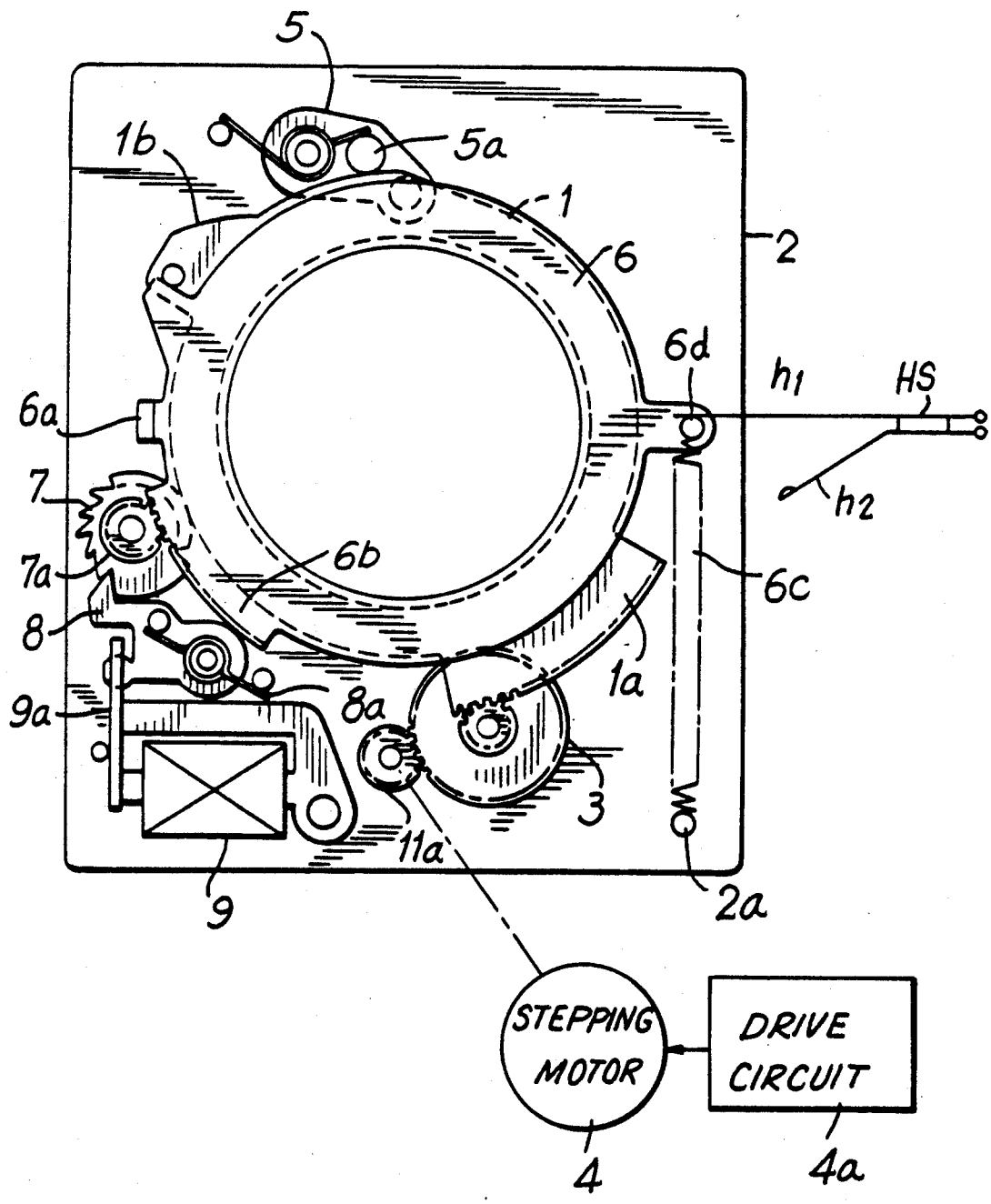
FIG. 6 is a view showing a conventional automatic focusing system for a camera.

The light measurement/exposure program $EXC_3$ shown in FIG. 4 will be executed as follows. When the process indicator PI is neither zero (0) nor eight (8), the system malfunctions (illegal function ILL), and an alarm is provided according to a predetermined program (not shown). When PI=0, the power hold is set to L at point $F_{25}$ to terminate the whole operation. When PI=8, the system is properly operated. At point $F_{26}$, the AF magnet is rendered nonmagnetized or off. At point $F_{27}$, the intensity of light is measured. At point $F_{28}$, the AF magnet is rendered magnetized or on. At point $F_{29}$, an exposure mode of operation is initiated. At point $F_{30}$, the AF magnet is again rendered nonmagnetized or off. At point $F_{31}$, the distance-setting member 6 is returned to its initial position.

At point $FH_4$, the monitoring point $SOB_4$ is active to monitor the operating condition of the home switch Hs to find whether it is off or not. When the home switch Hs is properly operated, the improper engagement preventing program $EXC_4$ is initiated. If not properly operated, then a one is added to the counter at point $F_{32}$. At point $F_{33}$, the number (P) of outputs is found. At point $F_{34}$, four pulses are generated to rotate the stepper motor 4 in a reverse direction. The monitoring point $SOB_4$ is again active to determine whether the home switch Hs is properly operated.

The improper engagement preventing program $EXC_4$ has a subroutine $F_{35}$ wherein two pulses are generated, one for clockwise rotation of the stepper motor 4 and another for counterclockwise rotation thereof. This program is intended to ensure proper engagement of the first tooth of the ratchet wheel 7 with the pawl 8.

In a film advance program $EXC_5$, a film is advanced by a single stroke at point $F_{36}$. At point $F_{37}$, the process indicator $P_1$ is set to zero (0). Then, the power hold is set to L at point $F_{25}$.

The operation is as follows. In the automatic focusing system of the present invention thus constructed, after the distance determination program $EXC_1$ has been completed, at point $FH_1$ in the sequence analysis program ANL, the monitoring point $SOB_1$ is active to find whether the home switch Hs is off or not. If the home switch Hs is off, then three pulses are generated for reverse rotation as shown at point $F_4$. The drive member 1 is thus rotated from an angle of $\theta_1$ to an angle of $\theta_2$. At point $F_5$, the AF magnet is rendered magnetized or is turned on. At point $F_6$, three pulses are generated for clockwise rotation. The drive member 1 is rotated to an angle $\theta_1'$ to reach the monitoring point $SOB_2$. When eight pulses are generated, then the drive member 1 is rotated to an angle of $\theta_3$ to reach the monitoring point $SOB_3$. Finally, at point $FH_4$ in the light measurement/exposure program shown in FIG. 4, the monitoring point $SOB_4$ is active to find whether the home switch Hs is off or not. At point $F_{31}$, the drive member is returned to its initial position. The lens returning process occurs from point $F_{31}$ to point $FH_4$.

When the drive member 1 is rotated to the maximum angle $\theta_4$, the sector (not shown) is opened by the operating cam of the drive member 1 in an exposure process.

Illustratively, mechanical contacts are used to form the home switch. Alternatively, semiconductor elements such as a photocoupler may be used. Also, the drive member and the distance-setting member may be linearly positioned. The motor may be an ultrasonic motor.

Advantages of the invention are as follows:

In accordance with the present invention, an automatic focusing system for a camera comprises a motor rotatable in both directions, a drive member driven for rotation by the motor, a distance-setting member rotatable together with the drive member to place an objective lens in an initial position and movable to a predetermined forward position, a holding mechanism for holding said distance-setting member in said predetermined forward position, means for identifying the position of said drive member at each monitoring point, said means being operable to generate a position identification signal, and means for analyzing a sequence of movement of said distance-setting member from a starting position to said predetermined forward position. This arrangement can identify the position of the drive member at each sequence monitoring point, thereby preventing malfunction of the system and reducing the focusing stroke of the holding mechanism.

Also, in accordance with the present invention, an automatic focusing system for a camera comprises a motor rotatable in both directions, a drive member driven for rotation by the motor, a distance-setting member rotatable together with the drive member to place an objective lens in an initial position and movable to a predetermined forward position, a holding mechanism for holding the distance-setting member in the predetermined forward position, means for identifying the position of the drive member at each monitoring point, the means being operable to generate a position identification signal, means for analyzing the sequence of movement of the distance-setting member from a starting position to the predetermined forward position, and means for preventing improper holding of the distance-setting member at the initial position. An advantage with this arrangement is that improper holding of the distance-setting member can be prevented.

Although the preferred embodiment of the present invention has been described in detail, it will be understood that many variations and changes may be made therein without departing from the spirit of the invention or the scope of the appended claims.

What we claim is:

1. An automatic focusing system for a camera comprising a motor rotatable in forward and reverse directions, a drive member driven for rotation in said directions by said motor, a distance-setting member having an initial position at which an objective lens is located prior to a focussing operation, said distance-setting member being rotatable together with said drive member to predetermined forward positions, a holding mechanism for holding said distance-setting member at said initial and a predetermined one of said forward positions, and being moved out of engagement with said distance-setting member during a focusing operation of said objective lens by reverse movement of said drive member, detecting means for detecting the positions of said drive member at a plurality of monitoring points independently of the position of said distance setting member after said reverse movement of said distance-setting member, said detecting means being operable to generate a position identification signal, and control means for controlling said motor for the sequence of movements of said drive member from a starting position to said predetermined one of said forward positions.

2. An automatic focusing system for a camera comprising a motor rotatable in forward and reverse directions, a drive member driven for rotation in said directions by said motor, a distance-setting member having an initial position at which an objective lens is located prior to a focussing operation, said distance-setting member being rotatable together with said drive member to predetermined forward positions, a holding mechanism for holding said distance-setting member at said initial and a predetermined one of said forward positions, and being moved out of engagement with said distance-setting member during a focusing operation of said objective lens by reverse movement of said drive member, detecting means for detecting the position of said drive member at a plurality of monitoring points independently of the position of said distance setting member after said reverse movement of said distance-setting member, said detecting means being operable to generate a position identification signal, and control means for controlling said motor for the sequence of movements of said drive member from a starting position to said one of said predetermined forward positions, said control means comprising means for selectively preventing holding of said distance-setting member at said initial position.

3. An automatic focusing system for a camera having a drive member for controlling the operation of a shutter, a reversible stepping motor for moving said drive member in forward and reverse directions, a source of pulses coupled to said motor, a distance setting member for controlling the position of a lens, means for coupling said distance setting member to said drive member for movement therewith from an initial position, means responsive to reverse direction movement of said motor for moving said drive member and distance setting members to said initial position, means responsive to forward direction of movement of said motor for moving said distance setting member to focus said lens, means responsive to focussing of said lens for stopping and holding said distance setting member at a predetermined position, a home switch for detecting predetermined movement of said distance setting member independently of the position of said distance setting member after said reverse direction movement of said distance-setting member, said home switch being operated with a delay following movement of said distance setting member from said initial position, means for coupling said home switch to said drive member, and control means responsive to the operation of said home switch following movement of said distance-setting member away from said initial position, for detecting movement of said distance-setting member.

4. An automatic focusing system for a camera comprising a motor means rotatable in first and second opposite directions, a drive member driven for rotation in said directions by said motor means, a distance-setting member rotatably driven by said drive member upon movement of said motor means in said first direction to a predetermined position to place an objective lens in an initial position, a holding mechanism for holding said distance-setting member in said predetermined position, detecting means coupled to said drive member and independent of the position of said distance setting member for detecting the rotation of said drive member to a given position as said motor is rotating in said second direction following rotation of said distance-setting member in said first direction, said detecting means being operable to generate a position identification signal, and control means for controlling the sequence of movements of said distance-setting member from a starting position to said predetermined position, thereby preventing malfunction of the system and reducing the focusing movement of said holding means.

5. An automatic focusing system for a camera according to claim 4, further comprising means for selectively preventing holding of said distance-setting member by said holding means at said initial position.

* * * * *